(12) United States Patent
Bevacqua

(10) Patent No.: US 10,327,436 B2
(45) Date of Patent: Jun. 25, 2019

(54) POTTED PLANT GUARD

(71) Applicant: Lorraine Bevacqua, Newberg, OR (US)

(72) Inventor: Lorraine Bevacqua, Newberg, OR (US)

( * ) Notice: Subject to any disclaimer, the term of this patent is extended or adjusted under 35 U.S.C. 154(b) by 221 days.

(21) Appl. No.: 15/296,534

(22) Filed: Oct. 18, 2016

(65) Prior Publication Data

US 2018/0103594 A1 Apr. 19, 2018

(51) Int. Cl.
*A01G 13/02* (2006.01)
*A01M 29/30* (2011.01)
*A01G 13/10* (2006.01)

(52) U.S. Cl.
CPC ......... *A01M 29/30* (2013.01); *A01G 13/0281* (2013.01); *A01G 13/10* (2013.01)

(58) Field of Classification Search
CPC . A01G 13/0237; A01G 13/0243; A01G 13/02
USPC ............................................. 47/20.1, 30–31.1
See application file for complete search history.

(56) References Cited

U.S. PATENT DOCUMENTS

| | | | | |
|---|---|---|---|---|
| 26,849 A | * | 1/1860 | Hively | A01G 13/04 47/31 |
| 87,313 A | * | 2/1869 | Wickes | A01G 13/04 47/31 |
| 98,892 A | * | 1/1870 | Sprague | A01G 13/04 47/31 |
| 115,531 A | * | 5/1871 | Schwagerl | A01G 13/0243 47/32.4 |
| 1,074,828 A | * | 10/1913 | Bigelow | A01G 13/04 47/31 |
| 1,544,322 A | * | 6/1925 | Kellermann | A01G 2/00 47/31 |
| 1,780,950 A | * | 11/1930 | Stevason | A01G 13/043 47/31 |
| 2,252,073 A | * | 8/1941 | Gray | A01G 13/0237 211/13.1 |
| 3,681,872 A | * | 8/1972 | Leitch | A01G 7/06 239/104 |
| 4,005,548 A | * | 2/1977 | Nahon | A01G 9/12 182/180.1 |
| 4,700,507 A | * | 10/1987 | Allen | A01G 13/0243 47/32.4 |
| 4,711,051 A | * | 12/1987 | Fujimoto | A01G 13/04 47/29.2 |

(Continued)

FOREIGN PATENT DOCUMENTS

| | | | | |
|---|---|---|---|---|
| DE | 202015105620 U | * | 11/2015 | ......... E04H 12/2238 |
| WO | WO-2016137223 A2 | * | 9/2016 | ............. A01G 31/02 |

*Primary Examiner* — Magdalena Topolski
*Assistant Examiner* — Morgan T Barlow
(74) *Attorney, Agent, or Firm* — Jerry D. Haynes; Law Office of Jerry D Haynes

(57) ABSTRACT

A potted plant guard for protecting a pot from rodents that includes: a frame, wherein the frame creates an outer perimeter of the potted plant guard; a grid within the frame, where the grid includes a plurality grid member; a group of removable grid members within the plurality of grid members; a group of permanent grid members within the plurality of grid members; and a plurality of openings along the frame, wherein the openings are adapted to receive the removable grid members. The frame is preferably circular in shape.

5 Claims, 4 Drawing Sheets

(56) References Cited

U.S. PATENT DOCUMENTS

| | | | | |
|---|---|---|---|---|
| 4,858,380 A * | 8/1989 | Gayle | A01G 13/0237 | 47/31 |
| 4,977,703 A * | 12/1990 | Blanc | A01G 13/0281 | 47/30 |
| 5,090,155 A * | 2/1992 | Rodgers | A01G 13/043 | 47/30 |
| 5,355,623 A * | 10/1994 | Brown | A01G 13/0281 | 47/32 |
| 5,426,887 A * | 6/1995 | Spencer | A01G 13/04 | 47/29.2 |
| 5,930,948 A * | 8/1999 | Daniel | A01G 13/10 | 135/158 |
| 6,061,953 A * | 5/2000 | Chubb | A01G 13/0281 | 47/31.1 |
| 6,170,788 B1 * | 1/2001 | Stevenson | A01G 13/0237 | 248/153 |
| 6,457,276 B1 * | 10/2002 | Masters | A01G 5/04 | 428/23 |
| 6,505,438 B1 * | 1/2003 | Hsia | A01G 13/0237 | 47/24.1 |
| 6,640,490 B1 * | 11/2003 | Boehringer | A01G 13/0281 | 47/32 |
| 6,889,470 B1 * | 5/2005 | Hill | A01G 13/04 | 47/31 |
| 6,944,989 B1 * | 9/2005 | Bradley | A01G 13/0212 | 256/1 |
| 7,555,862 B2 * | 7/2009 | Li | A01G 13/0256 | 405/302.7 |
| 7,707,769 B1 * | 5/2010 | Courter | A01G 5/02 | 47/41.01 |
| 7,798,102 B2 * | 9/2010 | Mouzakitis | A01K 61/85 | 119/200 |
| 8,308,141 B1 * | 11/2012 | Mellins | A01K 3/00 | 256/11 |
| 8,381,440 B1 * | 2/2013 | Jabs | A01G 13/0281 | 47/29.5 |
| 8,464,463 B1 * | 6/2013 | Fraser | A01G 13/10 | 47/31 |
| 8,763,306 B1 * | 7/2014 | Perlsweig | A01G 13/10 | 47/41.1 |
| D735,541 S * | 8/2015 | Anderson | A01G 7/06 | D8/1 |
| 2002/0069831 A1 * | 6/2002 | Clark | A01K 61/17 | 119/215 |
| 2006/0112621 A1 * | 6/2006 | White | A01G 13/043 | 47/31 |
| 2007/0084108 A1 * | 4/2007 | Hertlein | A01G 9/122 | 47/47 |
| 2007/0266625 A1 * | 11/2007 | Markis | A01G 13/10 | 47/31 |
| 2009/0172999 A1 * | 7/2009 | Thorne | A01G 13/02 | 47/22.1 |
| 2009/0320359 A1 * | 12/2009 | Hertlein | A01G 9/122 | 47/47 |
| 2010/0320105 A1 * | 12/2010 | Aubery | A63B 55/00 | 206/315.7 |
| 2011/0219682 A1 * | 9/2011 | Butler | A01G 13/0243 | 47/31 |
| 2012/0011767 A1 * | 1/2012 | Han | A01G 13/0281 | 47/30 |
| 2013/0219782 A1 * | 8/2013 | Workman | A01G 13/02 | 47/30 |
| 2014/0196364 A1 * | 7/2014 | Mayner | A01G 13/04 | 47/29.1 |
| 2014/0259901 A1 * | 9/2014 | Williams | A01G 13/10 | 47/31 |
| 2014/0352208 A1 * | 12/2014 | Makropoulos | A01G 13/0293 | 47/31.1 |
| 2015/0289454 A1 * | 10/2015 | Legus | A01G 9/12 | 47/45 |
| 2016/0044875 A1 * | 2/2016 | Nutter | A01G 13/04 | 47/20.1 |
| 2016/0088805 A1 * | 3/2016 | Gyllenhammer | A01G 13/0243 | 47/31 |
| 2016/0157441 A1 * | 6/2016 | Esler | A01G 13/0237 | 43/124 |
| 2017/0049055 A1 * | 2/2017 | Newman | A01D 46/26 | |
| 2017/0181386 A1 * | 6/2017 | Zusy | A01G 13/0243 | |
| 2017/0231170 A1 * | 8/2017 | McCarthy | A01G 9/16 | 47/17 |
| 2017/0318760 A1 * | 11/2017 | Legus | A01G 17/06 | |

\* cited by examiner

POTTED PLANT GUARD

BACKGROUND OF THE INVENTION

Field of Invention

The present invention relates to a guard used to protect potted plants from rodents.

Description of Related Art

Many individuals enjoy flowering plants in pots as a gardening hobby. Pots may be used to grow vegetables, bulbs, herbs or flowers. The bulbs normally must be planted in a particular type of soil within a pot to grow certain plants. One drawback to using pots is that rodents such as squirrels or other pests may dig the bulbs up, consume the bulb or otherwise uproot the plant during the growing process. It is imperative that the bulb remains undisturbed while in the pot in order for the plant to fully mature. It would therefore be advantageous to have a device that could be used to protect the bulb and plant in the form of a guard.

SUMMARY OF THE INVENTION

The present invention relates to a potted plant guard for protecting a pot from rodents comprising: a frame, wherein the frame creates an outer perimeter of the potted plant guard; a grid within the frame, where the grid includes a plurality grid member; a group of removable grid members within the plurality of grid members; a group of permanent grid members within the plurality of grid members; and a plurality of openings along the frame, wherein the openings are adapted to receive the removable grid members. The frame is preferably circular in shape.

DETAILED DESCRIPTION

The present invention relates to a potted plant guard used for protecting a pot from a rodent. The potted plant guard according to present invention is very effective in preventing squirrels and other similar rodents from invading a pot which is cultivating a bulb. The potted plant guard according to present invention includes a frame that serves as the outer perimeter for the potted plant guard. The grid is arranged within the frame, where the grid includes permanent and removable grid members. Some grid members may be removed as necessary to provide adequate spacing for the plant within the pot. However, the guard ideally includes a complete grid that provides full protection of a pot from rodents. The guard may vary in size as needed to accommodate different size pots. Further anchor pins are attached to the grid and provide the anchoring basis for supporting the guard within the pot during use.

Figure 1A:
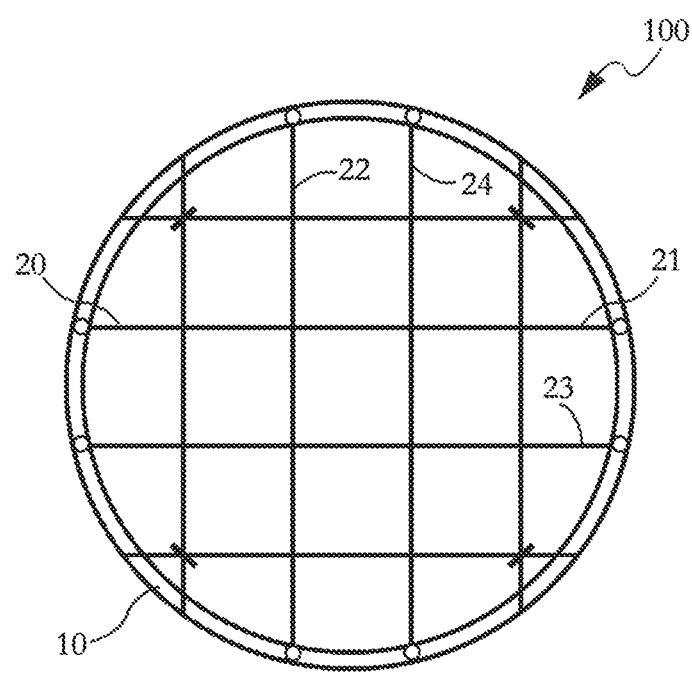
FIG. 1A depicts a top view of a potted plant guard in accordance with the present invention.
Figure 1B:
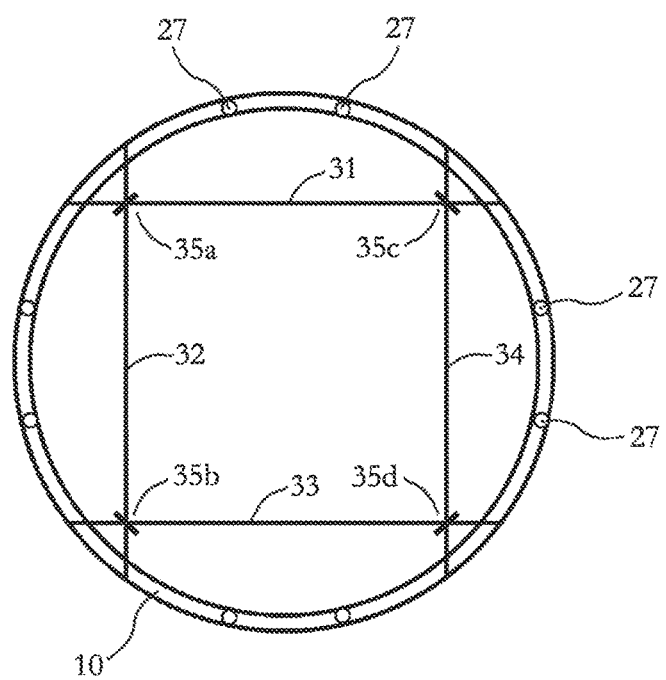
FIG. 1B depicts the potted plant guard according to the present invention with permanent grid members only.

In reference to FIG. 1, a potted plant guard 100 is depicted in accordance with the present invention. The potted plant guard 100 includes a frame 10 and a grid 20. The frame 10 is preferably circular in shape to accommodate a garden pot. However, the frame 10 may be configured in other shapes as needed. The grid 20 includes vertical extending arching grid members 21, 22, 23, 24 as shown in FIG. 1A. These particular grid members 21, 22, 23, 24 are removable to create necessary access to the underlying plant area. A series of openings 27 are shown along the perimeter of the frame 10, which are shown in FIG. 1B that receive the removable grid members. This top view is also shown in FIG. 1B with the removable grids members 21, 22, 23, 24 removed. The remaining vertical extending arching grid members 31, 32, 33, and 34, as shown in FIG. 1B, are permanently attached to the frame 10. Further connection points 35a, 35b, 35c and 35d show where the permanent grid members 31, 32, 33, 34 are shown as welded together at the four connection points. The grid members 31, 32, 33, 34 are also permanently welded onto the frame 10.

Figure 2:
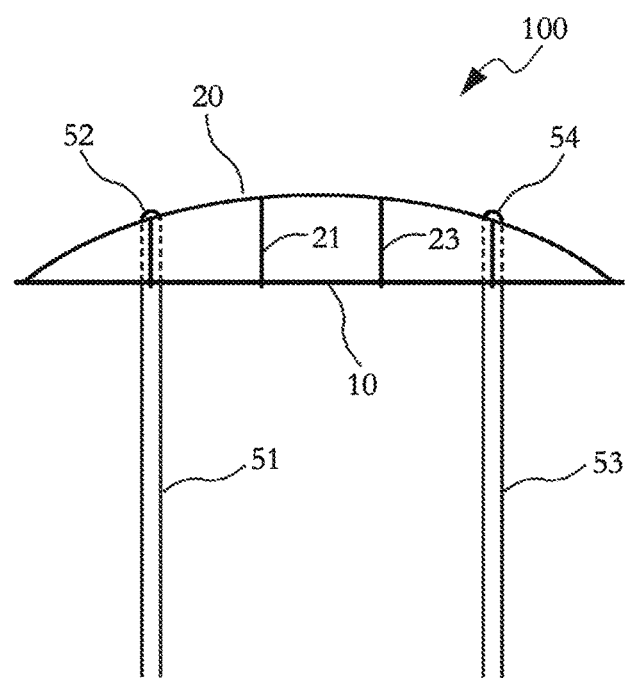
FIG. 2 depicts a side view of the potted plant guard in accordance with the present invention.

A side view of the potted plant guard 100 is shown in FIG. 2. The side view shows anchoring pins 51, 53 inserted onto the grid 20 at contact points at 52, 54. These anchoring pins 51, 53 are adapted to anchor the potted plant guard 100 within the soil of the pot. The anchoring pins 51, 53 slide over the connection points 35a, 35b, 35c and 35d to anchor the potted plant guard 100 into place.

Figure 3A:
FIG. 3A shows a removable grid member in accordance with the present invention.
Figure 3B:
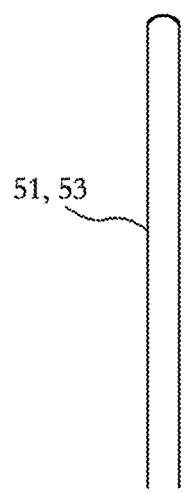
FIG. 3B depicts an anchor pin in accordance with the present invention.

FIG. 3A shows an exemplary grid member, 21, 23 for use with the present invention. Each removable grid member includes two end points 24a, 24b to insert into the respective opening 27 shown on the frame 10. Further as can be seen each grid member 21, 23 are arched in shape, extending across the frame 10. Each end point 24a, 24b supports the removable grid within the frame 10. FIG. 3B shows an exemplary anchoring pin 51, 53 that is used to anchor the grid 20 in accordance with the present invention.

What is claimed is:

1. A potted plant guard for protecting a pot from rodents comprising:
    a frame, wherein the frame creates an outer perimeter of the potted plant guard;
    a grid within the frame, wherein the grid includes a plurality of arching grid members and said plurality of arching grid members includes a group of removable arching grid members and a group of permanent arching grid members; and
    a plurality of openings along the frame, wherein each of the openings is adapted to receive one of the removable grid members;
    wherein the group of permanent grid members are welded to the frame and each other and a plurality of openings along the frame, wherein each of the openings are is adapted to receive one of the removable grid members.

2. The potted plant guard according to claim 1, wherein said frame is circular in shape.

3. The potted plant guard according to claim 2, wherein the group of removable grid members includes two grid members extending in a first direction, and two additional grid members extending in a second direction, wherein the first direction and the second direction are perpendicular to each other.

4. The potted plant guard according to claim 2, wherein the group of permanent grid members includes two grid members extending in a first direction and two additional grid members extending in a second direction, wherein the first direction plane and second direction plane are perpendicular to each other.

5. The potted plant guard according to claim 1, further including a plurality of anchor pins, each of said plurality of anchor pins engages the grid to support the grid and frame into place.

\* \* \* \* \*